United States Patent
Mattela

(10) Patent No.: US 10,681,586 B2
(45) Date of Patent: *Jun. 9, 2020

(54) DEVICE FOR A VEHICULAR NETWORK PROVIDING INCIDENT RETRANSMISSION

(71) Applicant: Redpine Signals, Inc., San Jose, CA (US)

(72) Inventor: Govardhan Mattela, Hyderabad (IN)

(73) Assignee: Silicon Laboratories Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/436,134

(22) Filed: Jun. 10, 2019

(65) Prior Publication Data

US 2019/0312683 A1    Oct. 10, 2019

Related U.S. Application Data

(63) Continuation of application No. 15/656,854, filed on Jul. 21, 2017, now Pat. No. 10,362,509.

(60) Provisional application No. 62/432,105, filed on Dec. 9, 2016.

(51) Int. Cl.

| | | |
|---|---|---|
| *H04L 1/18* | (2006.01) | |
| *H04W 4/46* | (2018.01) | |
| *H04W 28/04* | (2009.01) | |
| *H04W 4/029* | (2018.01) | |
| *H04L 1/08* | (2006.01) | |
| *H04W 4/02* | (2018.01) | |
| *H04W 4/90* | (2018.01) | |
| *H04W 4/08* | (2009.01) | |
| *H04W 4/70* | (2018.01) | |
| *H04W 24/08* | (2009.01) | |
| *H04L 1/00* | (2006.01) | |
| *H04L 29/12* | (2006.01) | |
| *H04W 84/18* | (2009.01) | |

(52) U.S. Cl.
CPC ............ *H04W 28/04* (2013.01); *H04L 1/08* (2013.01); *H04L 1/188* (2013.01); *H04L 1/189* (2013.01); *H04W 4/026* (2013.01); *H04W 4/029* (2018.02); *H04W 4/08* (2013.01); *H04W 4/46* (2018.02); *H04W 4/70* (2018.02); *H04W 4/90* (2018.02); *H04W 24/08* (2013.01); *H04L 61/6022* (2013.01); *H04L 2001/0093* (2013.01); *H04W 84/18* (2013.01)

(58) Field of Classification Search
None
See application file for complete search history.

(56) References Cited

U.S. PATENT DOCUMENTS

| 7,323,991 B1 * | 1/2008 | Eckert | G07C 9/00111 340/572.1 |
|---|---|---|---|
| 8,923,183 B2 * | 12/2014 | Nagai | G08G 1/163 370/312 |
| 9,503,968 B2 * | 11/2016 | Nathanson | G07C 5/0808 |

(Continued)

*Primary Examiner* — Ajit Patel
(74) *Attorney, Agent, or Firm* — File-EE-Patents.com; Jay A. Chesavage

(57) ABSTRACT

A system for transmission of incident information includes maintaining a table of RSSI values for a plurality of stations. When an incident is detected, the system first sends a broadcast packet with incident information, and next sends a unicast packet to any station below a particular RSSI threshold until the unicast packet is acknowledged or a retransmission interval passes.

21 Claims, 4 Drawing Sheets

WAVE network Incident Reporting

(56) References Cited

U.S. PATENT DOCUMENTS

| | | | | |
|---|---|---|---|---|
| 9,549,319 | B1* | 1/2017 | Butler | H04W 12/06 |
| 9,959,756 | B2* | 5/2018 | Filley | H04W 4/90 |
| 2005/0002347 | A1* | 1/2005 | Lee | G08G 1/0104 |
| | | | | 370/312 |
| 2011/0034201 | A1* | 2/2011 | Hamada | H04L 67/12 |
| | | | | 455/517 |
| 2015/0312883 | A1* | 10/2015 | Han | H04H 20/62 |
| | | | | 370/328 |
| 2016/0295589 | A1* | 10/2016 | Nikopour | H04W 4/023 |
| 2017/0238270 | A1* | 8/2017 | Shen | H04J 3/0644 |
| | | | | 370/336 |
| 2017/0374601 | A1* | 12/2017 | Braga Ameixieira | H04W 40/20 |
| 2018/0324560 | A1* | 11/2018 | Xu | H04W 4/06 |

* cited by examiner

WAVE network Incident Reporting

WAVE network Incident Reporting

WAVE network Incident Reporting

| 102A RSSI Table | 120A RSSI Table | 118A RSSI Table |
|---|---|---|
| 104A:−40dbm | 104A:−40dbm | 104A:−95dbm |
| 106A:−45dbm | 106A:−45dbm | 106A:−90dbm |
| 120A:−45dbm | 102A:−45dbm | 120A:−95dbm |
| 108A:−50dbm | 108A:−50dbm | 108A:−75dbm |
| 122A:−50dbm | 122A:−50dbm | 122A:−80dbm |
| 114A:−55dbm | 114A:−40dbm | 102A:−100dbm |
| 110A:−65dbm | 110A:−45dbm | 114A:−70dbm |
| 116A:−80dbm | 116A:−60dbm | 112A:−40dbm |
| 124A:−80dbm | 124A:−60dbm | 116A:−40dbm |
| 112A:−90dbm | 112A:−70dbm | 124A:−40dbm |
| 118A:−100dbm | 118A:−80dbm | 110A:−50dbm |

WAVE network Incident Reporting

| 102A RSSI Table | 120A RSSI Table | 118A RSSI Table |
|---|---|---|
| 104A:−40dbm(+) | 104A:−40dbm(−) | 104A:−95dbm(+) |
| 106A:−45dbm(+) | 106A:−45dbm(−) | 106A:−90dbm(+) |
| 120A:−45dbm(−) | 102A:−45dbm(+) | 120A:−95dbm(−) |
| 108A:−50dbm(+) | 108A:−50dbm(−) | 108A:−75dbm(+) |
| 122A:−50dbm(−) | 122A:−50dbm(+) | 122A:−80dbm(−) |
| 114A:−55dbm(−) | 114A:−40dbm(+) | 102A:−100dbm(+) |
| 110A:−65dbm(+) | 110A:−45dbm(−) | 114A:−70dbm(−) |
| 116A:−80dbm(−) | 116A:−60dbm(+) | 112A:−40dbm(+) |
| 124A:−80dbm(−) | 124A:−60dbm(+) | 116A:−40dbm(−) |
| 112A:−90dbm(+) | 112A:−70dbm(−) | 124A:−40dbm(−) |
| 118A:−100dbm(+) | 118A:−80dbm(−) | 110A:−50dbm(+) |

RSSI Task

Incident Task

DEVICE FOR A VEHICULAR NETWORK PROVIDING INCIDENT RETRANSMISSION

The present patent application claims priority to provisional application Ser. 62/432,105 filed Dec. 9, 2016.

FIELD OF THE INVENTION

The present invention relates to vehicular communications. In particular, the invention relates to a method for sending critical message in a Wireless Access for Vehicular Equipment (WAVE) set of wireless On Board Equipment (OBE) devices under IEEE protocol 802.11p.

BACKGROUND OF THE INVENTION

WAVE networks operating under the IEEE 802.11p include the capability to send time-critical messages related to road hazards to other vehicles sharing the roadway. In some environmental conditions, it may not be possible to assure timely delivery of these messages through the WAVE infrastructure. For this reason, it is desired to provide a method for communication of incident messages such that these incident messages reach as many vehicles as possible.

OBJECTS OF THE INVENTION

A first object of the invention is a method for retransmission of critical messages, whereby a transmitting station first sends the critical message using a broadcast message in a first step, and thereafter retransmits the same critical message as a unicast message to identified stations which have a received signal strength indicator (RSSI) below a particular threshold, optionally continuing to retransmit the critical message as a unicast message until the message is acknowledged by stations which were sent the unicast message, or the expiry of a timeout for retransmission attempts.

A second object of the invention is a method for a receiver, the method having a step of measuring the receive signal strength indicator (RSSI) of each nearby station, identifying stations with an RSSI below a threshold, and upon receipt of an incident message, retransmitting the incident message to each station which is below the threshold.

SUMMARY OF THE INVENTION

The present invention provides a process for retransmission of critical messages in a system which each station maintains a periodically updated table of RSSI data for remote stations from which it has received wireless frames, each station having an associated RSSI and optionally a travel direction. When the RSSI for a remote station is detected as being below a particular threshold, the critical message is also transmitted as a unicast packet to that station when a critical hazard is detected for transmission to surrounding stations. Each station maintains a local table of surrounding station identifiers and associated RSSI. Upon detection of a critical hazard, the OBE host sends a broadcast message advising of the hazard, and, for stations with an RSSI below a particular RSSI threshold, follows with a unicast transmission to those stations below the RSSI threshold. The particular RSSI threshold is selected to be indicative of low likelihood of reception of the broadcast by the remote station. Unicast messages continue to be re-transmitted by the local station until each station acknowledges receipt of its respective unicast message, or a retransmission interval expires. Optionally, the unicast message after a broadcast is only sent to stations detected as travelling in the same direction as the sending station which are also below the particular threshold RSSI.

DETAILED DESCRIPTION OF THE INVENTION

Figure 1:
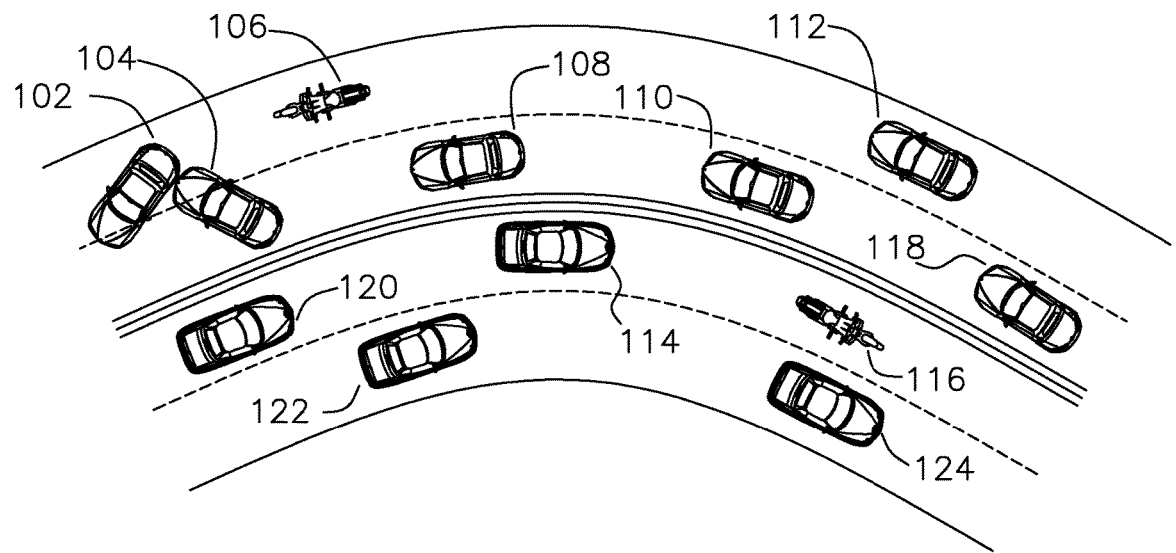
FIG. 1 shows a top view of vehicles on a roadway.

FIG. 1 shows an example of roadway vehicles 102 and 104 which have collided and have stopped in the roadway, with oncoming motorcycle 106 and vehicle 108 which are within a sightline of the accident, and oncoming traffic 110, 112, and 118 which are outside of a sightline of the accident, thereby presenting a hazard to all involved. Vehicles 120, 122, 114, 116, 124 travelling in an opposite direction are not affected by the accident involving vehicles 102 and 104.

Figure 2:
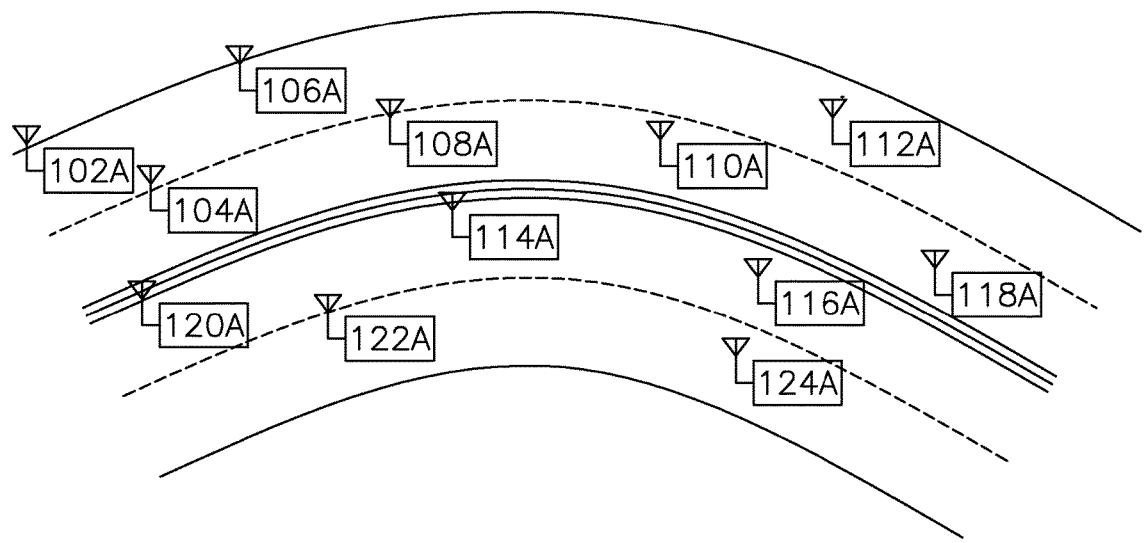
FIG. 2 shows a view of FIG. 1 with wireless OBE stations.
Figures 3, 4:
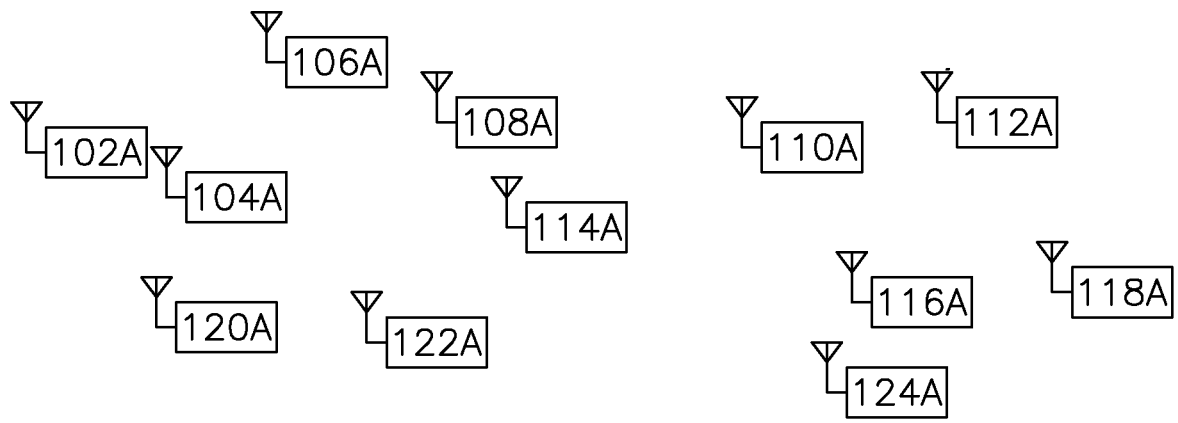
FIG. 3 shows a view of FIG. 2 without a road for reference.
FIG. 4 shows RSSI tables for selected OBE stations of FIGS. 1, 2, and 3.
Figures 5, 6:
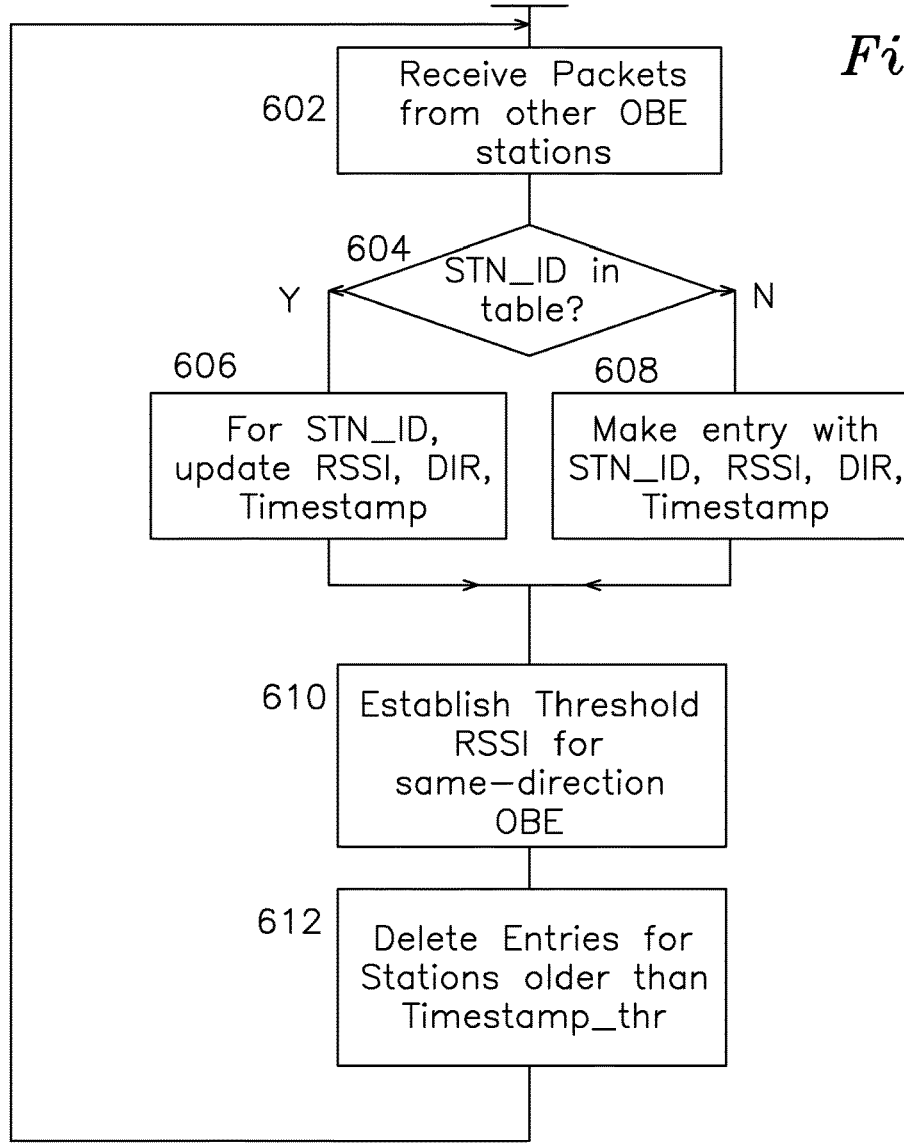
FIG. 5 shows RSSI tables including directional information for the selected stations of FIG. 4.
FIG. 6 shows a flowchart for forming a table of stations and associated RSSI, direction, and timestamp values.

FIG. 2 shows the same vehicles, represented by on board equipment (OBE) wireless stations with corresponding "A" suffix, where the OBE operates according to a WAVE or 802.11p standard. Such OBE equipment may transmit status or incident messages. As a collection of network nodes, the station topology is represented in FIG. 3, without the roadway or direction of movement shown for reference. Each station maintains an RSSI table of received transmissions, as shown in FIG. 4 for station 102A and 118A (moving in one direction, as seen in FIG. 1), with station 120 moving in the opposite direction. An alternative RSSI table is shown in FIG. 5, where the RSSI table for each station also includes a directional indicator, where (+) indicates the station with an associated RSSI is moving in the same direction as the subject station, and a (−) indicates the station is moving in an opposite direction. Such directional information may be estimated by relative frequency offset from Doppler shift of the received carrier signal, or by GPS vector information transmitted by the other station as part of its periodic transmission packet, or by examination of the change in GPS location or RSSI over several time samples of RSSI value for a particular station.

Where an incident occurs, such as the collision between vehicles 102 and 104 of FIG. 1, it is desired to provide an urgent status message to the other OBE equipment which is traveling toward the incident which has a higher likelihood of reception than a single broadcast packet, such that autonomous vehicles receiving the urgent status message may slow down, and surrounding drivers may be alerted of the incident. A broadcast message is the standard mechanism for transmission of such broadly relevant incident information by a detecting OBE, however if a distant station does not receive the broadcast, this failure to receive will not be known to the sender, as 802.11p broadcast messages are sent with a broadcast destination address, and are not acknowledged by the receiving station. In the present invention, the broadcast message to all stations from the detecting OBE is followed by a unicast message which contains the same incident information and content as the incident broadcast packet, but the unicast message is transmitted with a destination address of a particular station and received only by that station. The unicast messages are sent only to the stations with the weakest RSSI, or preferably to stations with an RSSI below a particular RSSI threshold. Unicast messages which are received by surrounding OBE stations are acknowledged with a return ACK packet, and the failure to receive an acknowledgement of the unicast packet with the critical incident information message by the OBE sender results in the retransmission of the unicast message. In this manner, each station maintains a table of RSSI values based on previously received messages, and stations with the weakest RSSI, or those stations below a threshold RSSI value are selected for transmission of a unicast message which contains the incident information of the broadcast packet, and the unicast message is retransmitted until acknowledged, or alternatively upon expiry of a retransmission timer either by number of retransmission attempts or duration of time the retransmissions were attempted.

In a variation of the protocol utilizing the directional information shown in FIG. 5, only stations identified as travelling in the same direction as the reference station are subject to the unicast message transmission. For example, with respect to vehicle 102 and station 102A, which has transmitted a host incident information message upon impact with vehicle 104 of station 104A shown in FIG. 1, vehicles 106, 108, 110, 112, and 118 are determined by examination of the associated remote host GPS data or RSSI data of host 104A as travelling in the same direction, and vehicles 120, 122, 114, 116, and 124 are determined as travelling in the opposite direction as indicated by their corresponding GPS data or RSSI information from the respective entries in the table for OBE host 102A of FIG. 5 which has detected the collision or other critical event requiring notification to surrounding vehicles. After the transmission of the broadcast incident message by OBE host 102A, a series of unicast information messages is transmitted from vehicles 102 (or 104 which may be operating using the same protocol) to each of hosts 108A, 110A, 112A, or 118A which are below the example FIG. 5 threshold RSSI threshold level of −49 dbm.

FIG. 6 shows an RSSI task flowchart, whereby after an entry 600, packets which are received from surrounding OBE stations 602 are examined by station identifier (such as MAC address) in step 604 to determine whether the station identifier is present in a station table such as was described for FIG. 5 102A for station 102. If the station identifier is not present in the table, a new entry is made 608 which includes the station identifier, RSSI, direction (or GPS history indicating whether travelling towards or away from the OBE host) with a timestamp indicating the time the packet was received so that it may be aged out of the table if a particular station has not been heard from. If the station identifier is already present in the table 606, then the RSSI, direction indication, and timestamp are updated 606. In step 610, a threshold RSSI is established for same-direction OBE stations (based on the DIR field for other stations), the threshold RSSI either being a fixed value or a variable value which, in one example of the invention, sets the RSSI threshold to place the weakest 5-20% of the stations by RSSI below the RSSI threshold. Other methods may be used to establish the RSSI threshold. In step 612, entries which are older than, for example, two to ten timestamp events, are deleted from the table, thereby removing vehicles which have not been detected as present by the host vehicle for an appropriate duration of time. After aging entries out of the table 612, the task resumes at step 600, running continuously to provide an updated table of detected OBE hosts.

Figure 7:
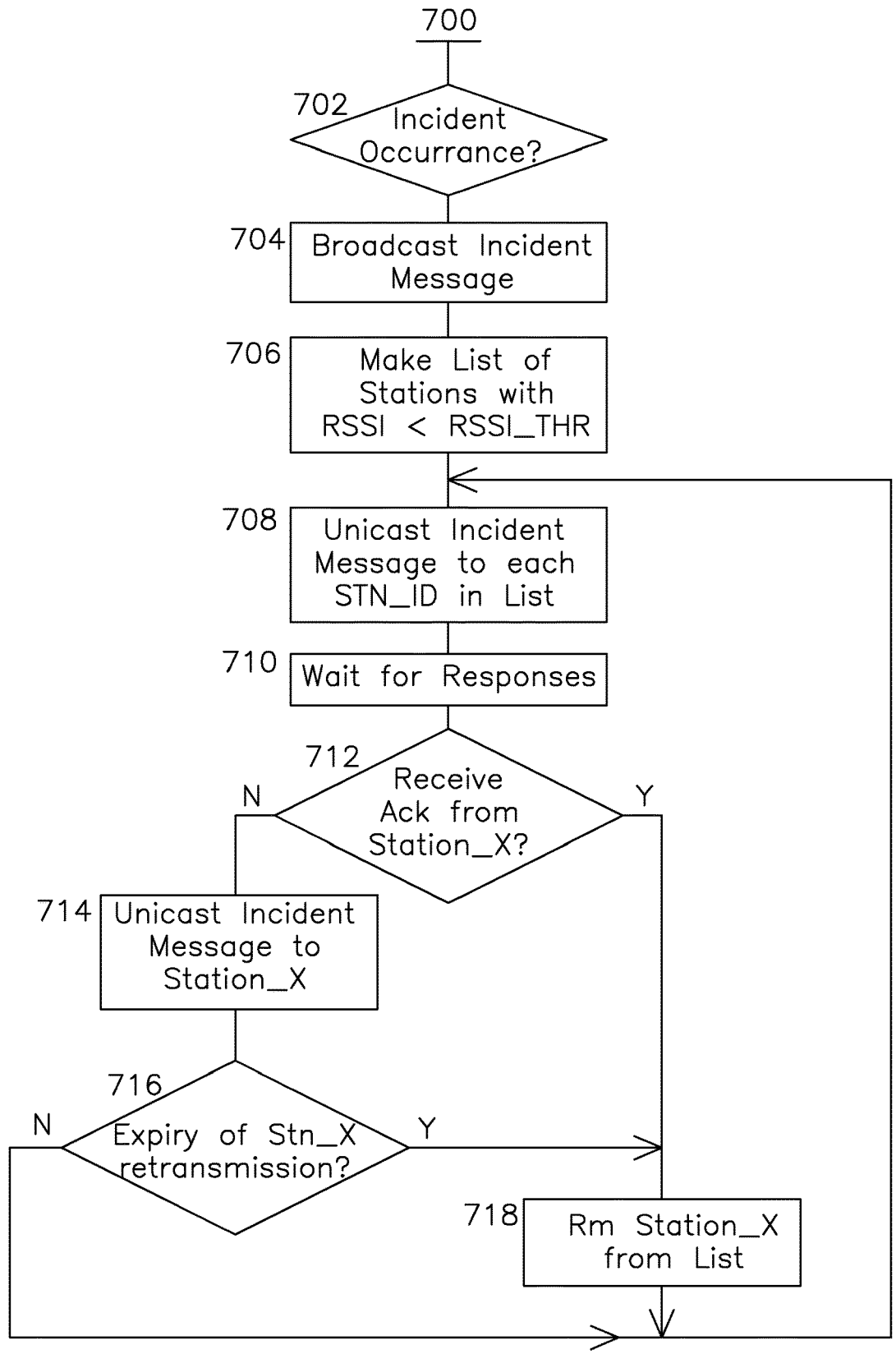
FIG. 7 shows a flowchart for transmitting an incident message.

FIG. 7 shows the incident task which is entered at point 700 when an incident is detected by an OBE station 702. The event may be a collision, mechanical failure, fire, or other event causing hazard to surrounding vehicles. The incident message is broadcast 704 to all stations, and a unicast list of stations 706 is formed with RSSI which falls below the RSSI threshold which was established in step 610 of FIG. 6. Each station (STN_ID) on the unicast list has a unicast incident message transmitted by the OBE station, and after a reply interval 710, each station which acknowledges the unicast incident message by transmitting an acknowledgement is removed from the unicast list 718 based on responding station identifier. If an acknowledgement is not received from a particular station on the unicast list, the unicast message is retransmitted to the non-responsive stations 714 on the unicast list until either an acknowledgement is received 718 or the retransmission timer 716 expires for each particular station on the unicast list, in which case the responding station is removed from the unicast list 718 as non-responsive. The incident message is treated as time-sensitive, so any station which has not responded either after an interval of time or after a certain number of retransmissions is removed from the unicast list 718, thereby ending retransmission of unicast incident messages.

I claim:

1. An On-Board Equipment (OBE) host station comprising:
    a retransmission RSSI threshold;
    a retransmission timer operative to expire an interval of time after enablement;
    a receiver for reception of wireless packets from remote OBE stations, the receiver providing a station identifier, a Received Signal Strength Indicator (RSSI) value and a timestamp value for each packet received from remote OBE stations;
    a table containing one or more entries, each entry comprising at least a station identifier, an RSSI value, and a timestamp;
    the OBE host station operative to replace an existing table entry for a newly received station identifier present in the table with an updated entry containing an associated RSSI value and timestamp value;
    the OBE host station operative to create a new table entry for a newly received station identifier not present in the table, the new table entry including a station identifier, an associated RSSI value, and timestamp value;
    the OBE host station operative to detect an incident, thereafter enabling the retransmission timer and making an incident unicast transmission of the incident to all station identifiers listed in the table having an RSSI value less than the retransmission RSSI threshold until the associated station of the unicast transmission acknowledges reception of the unicast incident transmission, or the retransmission timer expires.

2. The OBE host station of claim 1 where said unicast transmission comprises an 802.11p packet.

3. The OBE host station of claim 1 where said receiver determines a direction based on previous RSSI values associated with a particular station identifier, or from a GPS location included in the packet received from a remote OBE station.

4. The OBE host station of claim 1 where said unicast transmission is only to remote OBE stations moving in the same direction as the host OBE station.

5. The OBE station of claim 1 where the unicast incident transmission includes sending incident information to stations which are below the retransmission RSSI threshold and also travelling in the same direction as the station sending the incident information.

6. The OBE station of claim 1 where the station identifier is a media access controller (MAC) address.

7. The OBE station of claim 1 where the host OBE initiates the transmission of an incident message based on a collision, fire, mechanical failure or other event effecting surrounding vehicles.

8. The OBE station of claim 1 where the retransmission timer expires after 2 to 10 retransmission attempts without acknowledgement.

9. The OBE station of claim 1 where the retransmission RSSI threshold is a fixed value.

10. The OBE station of claim 1 where the retransmission RSSI threshold is selected to place 5% to 20% of the stations in the RSSI table below the selected retransmission RSSI threshold.

11. An On Board Equipment (OBE) host station comprising:
a transmitter for sending unicast packets;
a receiver for receiving packets from surrounding OBE stations;
a Received Signal Strength Indicator (RSSI) controller estimating an RSSI value for a received packet;
an RSSI threshold value;
a timestamp controller for providing a time of reception for a received packet;
a station identifier controller determining a station identifier for a received packet;
a station table having entries, the entries including at least: a station identifier, an RSSI value, and a timestamp;
the OBE host station operative to detect an incident, upon the detection of an incident, transmitting a unicast packet containing information about the incident to each station identified in the station table irrespective of the RSSI value, and retransmitting unicast packets containing information about the incident to each station in the station table which does not acknowledge the unicast packet and has an associated RSSI value which is less than the RSSI threshold value.

12. The OBE host station of claim 11 where the detection of an incident is either reception of a packet describing an incident or the determination of an incident by the OBE host.

13. The OBE station of claim 12 where the determination of an incident by the OBE host includes the determination of at least one of: a collision, a fire, a mechanical failure or an event effecting surrounding vehicles.

14. The OBE station of claim 11 where retransmitting unicast packets comprises one or more retransmissions until acknowledgement.

15. The OBE station of claim 11 where retransmitting unicast packets comprises 2 to 10 retransmission attempts without acknowledgement by an associated station identifier.

16. The OBE station of claim 11 where the RSSI threshold value is a fixed value.

17. The OBE station of claim 11 where the RSSI threshold value is selected to place 5% to 20% of the stations in the RSSI table below the selected RSSI threshold value.

18. The OBE station of claim 11 where the OBE station, upon receipt of an incident packet, either updates the table with an updated table entry for the associated station identifier, RSSI value, and timestamp, or creates a new entry comprising the station identifier, RSSI value, and timestamp when the station identifier is not found in the table.

19. An On Board Equipment (OBE) host operative to detect incidents and issue incident transmissions, the OBE host comprising:
a receiver for receiving incident packets for retransmission, each incident packet comprising an RSSI, a station identifier, and a timestamp;
an RSSI threshold value;
a station table containing a list of station identifiers, associated Received Signal Strength Indication (RSSI) values, and timestamp of receipt;
the OBE host operative to issue an incident transmission initially to all stations in the station table irrespective of the RSSI value, and thereafter retransmit to all stations not acknowledging the incident transmission and which are below the RSSI threshold value.

20. The OBE host of claim 19 where the detection of an incident comprises the receipt of an incident packet or the OBE host detection at least one of: a collision, a fire, a mechanical failure or an event effecting surrounding vehicles.

21. The OBE host of claim 19 where the RSSI threshold value is either a fixed value or is selected to place 5% to 20% of the stations in the RSSI table below the selected RSSI threshold value.

* * * * *